2,967,125
PHENYLCYCLOPENTYLAMINE FUNGICIDES

Arthur W. Carlson, Chicago, Ill., assignor to Velsicol Chemical Corporation, Chicago, Ill., a corporation of Illinois No Drawing. Filed Oct. 13, 1958, Ser. No. 766,665

2 Claims. (Cl. 167—30)

This invention relates to new chemical compositions of matter. More specifically, it relates to new chemical compositions of the general formula

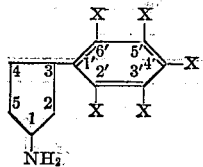

wherein X is an atom selected from the group consisting of hydrogen, halogen and their mixtures. Thus, when all the X are hydrogen, the compound is 3-phenylcyclopentylamine. A wide variety of related compounds contain combinations of halogen atoms and hydrogen atoms in the X positions. These compounds have been found to be unusually active as pest control agents and particularly as fungicides.

The compounds of this invention are prepared readily and in good yield by the condensation of 3-aminocyclopentene with the appropriate phenyl compound in the presence of a condensing agent such as anhydrous aluminum chloride. Excess condensing agent is required, since the basic amino group removes a mole of the acidic agent from active participation in the reaction. The reaction is generally carried out by adding the amine to a stirred mixture of the condensing agent and the phenyl compound, in an inert solvent if desired, at a temperature between about 0 and 10° C. The mixture is then heated at or slightly below reflux temperature for several hours to complete the reaction. The cooled reaction mixture is poured onto crushed ice and extracted with ether. The aqueous phase is then made basic with strong caustic and is extracted with ether. The combined ether extracts are then dried, filtered, and distilled to give the desired product.

Suitable phenyl compounds for use in producing the new chemical compounds of this invention are, for example, benzene, monochlorobenzene, ortho-dichlorobenzene, meta-dichlorobenzene, para-dichlorobenzene, 1,2,3-trichlorobenzene, 1,2,4-trichlorobenzene, 1,3,5-trichlorobenzene, 1,2,3,4-tetrachlorobenzene, 1,2,3,5-tetrachlorobenzene, 1,2,4,5-tetrachlorobenzene, pentachlorobenzene, and similar halogenated compounds. The resulting product of this invention when the phenyl compound is benzene is 3-phenylcyclopentylamine. When monochlorobenzene is used, the product is a 3-(chlorophenyl)cyclopentylamine. When the di-, tri-, tetra-, or pentachlorobenzenes are used, the products are 3-(dichlorophenyl)cyclopentylamine, 3-(trichlorophenyl)cyclopentylamine, 3-(tetrachlorophenyl)cyclopentylamine, and 3-(pentachlorophenyl)cyclopentylamine, respectively. Other halogen-substituted phenyl compounds can be used in order to make X a halogen other than chlorine in the final product. Thus, monoiodobenzene, monobromobenzene, monofluorobenzene, or pentabromobenzene can be used as starting materials to give 3-(iodophenyl)cyclopentylamine, 3-(bromophenyl)cyclopentylamine, 3-(fluorophenyl)cyclopentylamine, and 3-(pentabromophenyl)cyclopentylamine, respectively. Products with mixtures of halogen atoms in addition to hydrogen atoms in the X positions can also be made, for example, by the use of 1,3-chlorobromobenzene, which produces 3-(chlorobromophenyl)cyclopentylamine as the final product.

The compounds of this invention have unusual activity as pesticides and particularly as fungicides. The compound 3-phenylcyclopentylamine, for example, has been found to be toxic to a wide variety of economically important fungi. In experiments carried out by the slide germination technique adopted by the Committee on Standardization of Fungicidal Tests of the American Phytopathological Society, measured concentrations of spores of *Fusarium roseum* were placed on glass slides in contact with different concentrations of the compound being tested. Percentage germination of spores was then determined for each treatment after 24 hours' incubation at 72° F. In these experiments, the percentage spore germination noted at a concentration of 100 p.p.m. 3-phenylcyclopentylamine was zero. In similar glass slide spore germination tests on *Monilinia fructicola*, 3-phenylcyclopentylamine used at a concentration of 100 p.p.m. permitted an average of only one percent spore germination. Under similar conditions of the glass slide germination technique in which the test organism was *Stemphylium sarcinaeforme*, 3-phenylcyclopentylamine showed an $ED_{50}$ value in parts per million of 32.

Experiments were also carried out for control of bean rust on bean foliage. Pinto bean seedlings, grown under greenhouse conditions, were mounted on a special compound turntable and sprayed with the various compounds under test at several concentrations for 30 seconds at 30 pounds' pressure. The plants were allowed to dry, inoculated with spore suspensions of the bean rust organism, *Uromyces phaseoli*, and placed in an incubation chamber for 24 to 48 hours. The plants were then removed and maintained under greenhouse conditions for 10 to 14 days, whereupon the number of rust pustules on the leaves of each plant were determined. When compared to untreated controls, the use of 3-phenylcyclopentylamine at a concentration of 100 p.p.m. gave 95% control of bean rust under these experimental conditions.

When the compounds of this invention are used as pesticides, they are utilized in the manner recognized in the art. Thus they may be dissolved in organic solvents such as xylene or kerosene and used directly as sprays on the areas which are to be freed of the undesirable organisms. Similarly, they can be used as suspensions or emulsions in water by formulation with organic solvents and surface-active agents. They can also be formulated in other inert diluents such as the ta'cs or clays and thus be applied by dusting or by treatment of the soil. Other substances such as activators, synergists, spreaders, and adhesives can be added to the formulations if desired.

The following examples illustrate the manner in which the compounds of this invention are prepared and used.

EXAMPLE 1

*Preparation of 3-phenylcyclopentylamine*

Anhydrous aluminum chloride (160 g.; 1.2 moles) was stirred vigorously with 378 ml. of benzene in a 1-liter, 3-necked, round-bottomed flask fitted with a water-cooled reflux condenser (calcium chloride drying tube), thermometer, dropping funnel, and mechanical stirrer. The flask was cooled with ice to maintain a temperature of 0–5° C. in the reaction mixture while 3-aminocyclopentene (49.9 g.; 0.6 mole) in 54 ml. benzene was added dropwise. A total of 432 ml. (4.8 moles) of benzene was thus employed. When the addition of the amine was complete, the reaction mixture was heated to reflux temperature (about 82° C.) and was stirred and refluxed for 8 hours. The cooled reaction mixture was poured slowly onto 400 ml. cracked ice, and the mixture was stirred for 20 minutes. The mixture separated into layers in a separatory funnel, and the uppermost benzene layer was discarded. The lower, clear aqueous layer was found to contain no product, and hence the dark center layer was made basic with sodium hydroxide and extracted three times with 200-ml. portions of ether. The combined ether extracts were dried over anhydrous potassium carbonate, filtered, and distilled. After removal of the ether, distillation of the residue in vacuo gave 80.4 g. (83% of theory) of 3-phenylcyclopentylamine having a boiling range of 119 to 121° C. at 12 mm. pressure and an index of refraction (D line) of 1.5464 at 22° C. An analytical sample of the product distilled at 129 to 130° C. at 16 mm. pressure.

Analysis for $C_{11}H_{15}N$.—Calculated: C, 81.93%; H, 9.38%; N, 8.69%. Found: C, 81.83%; H, 9.53%; N, 8.77%.

EXAMPLE 2

*Preparation of 3-(4'-chlorophenyl)cyclopentylamine*

Monochlorobenzene (448 g.; 4.0 moles) and anhydrous aluminum chloride (133 g.; 1 mole) are mixed in a 1-liter, 3-necked, round-bottomed flask fitted as described in Example 1. The reaction mixture is cooled by immersing the flask in ice, and 3-aminocyclopentene (41 g.; 0.5 mole) is added dropwise while the reaction mixture is stirred vigorously and maintained at a temperature of 0–10° C. After all the amine has been added, the reaction mixture is heated to reflux and is refluxed and stirred for 5 hours to complete the reaction. The reaction mixture is then cooled and poured onto crushed ice and extracted with ether. Work-up of the extract as described in Example 1 and fractionation of the residue in vacuo gives the desired 3-(4'-chlorophenyl)cyclopentylamine.

EXAMPLE 3

*Preparation of 3-(pentachlorophenyl)cyclopentylamine*

A reaction is carried out in the apparatus (2-liter flask) and in the manner described in Example 1 with anhydrous aluminum chloride (133 g.; 1 mole), 3-aminocyclopentene (41 g.; 0.5 mole) and pentachlorobenzene (1000 g.; 4.0 moles) in 1000 cc. of carbon disulfide. Work-up of the reaction product as described in Example 1 gives the desired compound, 3-(pentachlorophenyl)cyclopentylamine.

EXAMPLE 4

*Preparation of 3-(3',4'-dibromophenyl)cyclopentylamine*

A reaction is carried out in the apparatus and in the manner described in Example 1 with anhydrous aluminum chloride (133 g.; 1 mole), 3-aminocyclopentene (41 g.; 0.5 mole) and o-dibromobenzene (944 g.; 4.0 moles). The product is worked up in the manner described in Example 1 to give the desired compound, 3-(3',4'-dibromophenyl)cyclopentylamine.

EXAMPLE 5

*Preparation of an emulsifiable concentrate of 3-(3'4'-dibromophenyl)cyclopentylamine*

The following concentrate is prepared by mixing the ingredients intimately in the given percentage proportions by weight:

| | Percent |
|---|---|
| 3(3',4'-dibromophenyl)cyclopentylamine | 25 |
| Antarox A–400 | 40 |
| Methanol | 35 |

"Antarox A–400" is the trade name under which a non-ionic detergent of the aromatic polyethylene glycol ether type is sold. The above concentrate is diluted with water to the desired concentration for use.

EXAMPLE 6

*Preparation of an emulsifiable concentrate of 3-phenylcyclopentylamine*

The following ingredients are mixed thoroughly in the given percentage proportions by weight:

| | Percent |
|---|---|
| 3-phenylcyclopentylamine | 59 |
| Xylene | 10 |
| Triton X–100 | 5 |
| Kerosene | 26 |

"Triton X–100" is the trade name under which an emulsifier of the alkyl aryl polyether alcohol type is sold. The above concentrate is diluted with water to the desired concentration for use.

EXAMPLE 7

*Preparation of a dust from 3-(pentachlorophenyl)cyclopentylamine*

3-(pentachlorophenyl)cyclopentylamine (65% by weight) is heated in a melt kettle with xylene (35% by weight) until solution is effected. Attapulgite clay carrier is placed in a ribbon blender, and sufficient 3-pentachlorophenyl)cyclopentylamine solution is sprayed in to give a 5% concentration of the chemical on the carrier. After pre-blending for 5 to 10 minutes, the formulation is ground to the desired particle size and transferred to a ribbon after-blender, where it is blended for 10 to 15 minutes before use.

While the outstanding utility of the compounds of this invention is in the field of control of undesirable fungal growth, the compounds are useful for a variety of other purposes. Aside from their applicability as new chemical intermediates, they have activity against other types of undesirable growth, such as bacteria. The compounds in which at least one of the X atoms is bromine, for example, are effective bacteriostats or bactericides. While the free amine compounds of this invention have been specifically described above, it is understood that for any and all the uses described, the compounds can also be used in the form of their acid salts, such as the hydrochlorides, sulfates, phosphates, and the like.

What is claimed in this invention is:

1. A method of destroying undesirable fungi which comprises contacting said fungi with a fungicidal composition comprising an inert carrier and as an essential active ingredient, in a quantity which is injurious to said fungi, a compound of the formula

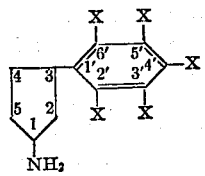

wherein each X is an atom selected from the group consisting of hydrogen, chlorine and bromine.

2. A fungicidal composition comprising an inert carrier and a fungicidal toxic amount of a compound of the formula

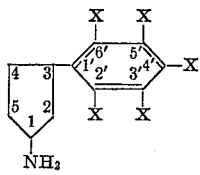

wherein each X is an atom selected from the group consisting of hydrogen, chlorine and bromine.

References Cited in the file of this patent

UNITED STATES PATENTS 2,248,925    Lincoln et al. _____ July 15, 1941
2,520,516    Van Zoeren _____ Aug. 29, 1950

OTHER REFERENCES

Burton et al.: Journal of the Chemical Society (1939), p. 1414.